(12) United States Patent
Ji (10) Patent No.: US 7,923,158 B2
(45) Date of Patent: Apr. 12, 2011

(54) FUEL CELL SYSTEM AND METHOD OF CONTROLLING THE SAME

(75) Inventor: Jun Ho Ji, Namyangiu-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 730 days.

(21) Appl. No.: 11/889,661

(22) Filed: Aug. 15, 2007

(65) Prior Publication Data

US 2008/0113231 A1    May 15, 2008

(30) Foreign Application Priority Data

Nov. 10, 2006 (KR) .................. 10-2006-0111279

(51) Int. Cl.
  *H01M 8/06* (2006.01)
  *H01M 8/04* (2006.01)
(52) U.S. Cl. .................. 429/408; 429/412; 429/428
(58) Field of Classification Search .............. 429/17–20; 502/104
  See application file for complete search history.

(56) References Cited

U.S. PATENT DOCUMENTS

| | | | |
|---|---|---|---|
| 3,295,565 A * | 1/1967 | Grandy, Jr. .................. | 141/67 |
| 2003/0026747 A1 * | 2/2003 | Zhu et al. .................. | 422/190 |

FOREIGN PATENT DOCUMENTS

| | | |
|---|---|---|
| EP | 1 198 020 | 4/2002 |
| EP | 1 357 084 | 10/2003 |
| JP | 2004-220949 | 8/2004 |
| JP | 2005-116311 | 4/2005 |

OTHER PUBLICATIONS

Extended European Search Report for corresponding European Application 07114737.5-1227; dated Nov. 23, 2009.

* cited by examiner

*Primary Examiner* — Karie O'Neill Apicella
(74) *Attorney, Agent, or Firm* — Staas & Halsey LLP (57) ABSTRACT

A fuel cell system capable of preventing reaction efficiency from being reduced although, the activity of an oxidation catalyst bed is deteriorated due to continuous operation. The fuel cell system includes a reformer which generates a fuel gas through a reforming reaction, a carbon monoxide purifier which includes a reactor main body having an inlet into which a reformed fuel gas is introduced and an outlet through which a purified fuel gas is discharged, and an oxidation catalyst bed that is filled in the reactor main body, and reduces a concentration of carbon monoxide contained in the fuel gas generated from the reformer, at least one electricity generator which is supplied with the fuel gas from the carbon monoxide purifier, and which generates electricity by means of a chemical reaction, and a catalyst supply which generates catalyst particles from material and supplying the catalyst particles to the oxidation catalyst bed.

10 Claims, 7 Drawing Sheets

FUEL CELL SYSTEM AND METHOD OF CONTROLLING THE SAME

CROSS-REFERENCE TO RELATED APPLICATIONS

This application claims the benefit of Korean Patent Application No. 2006-111279, filed on Nov. 10, 2006, in the Korean Intellectual Property Office, the disclosure of which is incorporated herein by reference.

BACKGROUND OF THE INVENTION

1. Field of the Invention

The present invention relates generally to a fuel cell system. More particularly to a fuel cell system capable of supplying new catalyst particles to a carbon monoxide purifier, the reaction efficiency of which is reduced.

2. Description of the Related Art

A conventional fuel cell system is an electricity generating system that directly converts the chemical reaction energy, which is generated by the reaction of a fuel gas and an oxidant gas, into the electrical energy. Recently, as the problems concerning the exhaustion of energy sources and the environmental pollution, this fuel cell is used in various fields such as non-polluting motor vehicles, household electricity generating systems, mobile telecommunication equipment, medical instruments, military equipment, and so on.

The conventional fuel cell system includes, for example, a stack, a fuel processing unit and a fuel tank. The fuel processing unit includes a reformer that reforms fuel to generate a hydrogen gas, and a carbon monoxide purifier which reduces a concentration of carbon monoxide contained in the hydrogen gas. One example of the carbon monoxide purifier is a preferential CO oxidation (PROX) reactor which is well-known in the art.

The carbon monoxide purifier includes a reactor main body having an internal space, and an oxidation catalyst bed filled in the reactor main body. Each oxidation catalyst has a structure in which each pellet-like carrier composed of alumina ($Al_2O_3$), silica ($SiO_2$), etc. carries at least one catalytic material such as platinum (Pt) or ruthenium (Ru). These oxidation catalysts are stratified to form the oxidation catalyst bed.

Accordingly, when the hydrogen gas generated from the reformer is supplied into the reactor main body, and then passes through the oxidation catalyst bed, the carbon monoxide contained in the hydrogen gas causes a selective oxidation reaction, so that it is changed into carbon dioxide. Accordingly, the concentration of carbon monoxide is reduced.

In this carbon monoxide purifier, with the lapse of time, the oxidation catalyst bed is poisoned to deteriorate the activity of the catalyst, so that the reaction efficiency of the carbon monoxide purifier is reduced. For this reason, in the conventional carbon monoxide purifier, a thickness of the oxidation catalyst bed is made sufficiently thick, so that, although the activity of the catalyst situated upstream is deteriorated, the catalyst situated downstream allows the carbon monoxide to facilitate the oxidation reaction.

However, because the conventional carbon monoxide purifier includes a thick catalyst bed in consideration of the durability of the oxidation catalyst, it cannot help increasing its volume. Consequently, the conventional fuel cell system cannot be downsized.

Further, since the oxidation catalyst bed is formed to have a thickness thicker than required, the initial cost of production is increased, and the loss of pressure is increased when the hydrogen gas passes through the thick oxidation catalyst bed. As a result, the operation energy of the fuel cell system is increased.

In addition, when the conventional carbon monoxide purifier does not provide the oxidation catalyst bed with a sufficient thickness due to the restriction of its internal space, the carbon monoxide purifier, the durability of which comes to an end, must be periodically replaced. Thus, the fuel cell system increases the cost of maintenance.

SUMMARY OF THE INVENTION

Accordingly, an aspect of the present invention is to provide a fuel cell system capable of preventing reaction efficiency from being reduced although the activity of an oxidation catalyst bed is deteriorated due to continuous operation.

It is another aspect of the present invention is to provide a fuel cell system capable of being downsized and securing sufficient durability, and a method of controlling the same.

Additional aspects and/or advantages of the invention will be set forth in part in the description which follows and, in part, will be apparent from the description, or may be learned by practice of the invention.

The foregoing and/or other aspects of the present invention are achieved by providing a fuel cell system, which includes a reformer to generate a fuel gas through a reforming reaction, a carbon monoxide purifier including a reactor main body having an inlet into which a reformed fuel gas is introduced and an outlet through which a purified fuel gas is discharged, and an oxidation catalyst bed which is filled in the reactor main body, and reducing a concentration of carbon monoxide contained in the fuel gas generated from the reformer, at least one electricity generator supplied with the fuel gas from the carbon monoxide purifier and generating electricity by means of a chemical reaction, and a catalyst supply generating catalyst particles from material and supplying the catalyst particles to the oxidation catalyst bed.

According to an aspect of the present invention, the catalyst supply includes a catalyst particle generator that heats the material to generate the catalyst particles. Further, the catalyst supply further includes a flow source that causes the catalyst particles generated from the catalyst particle generator to flow to the oxidation catalyst bed.

According to an aspect of the present invention, the flow source includes a gas tank in which gas is filled at high pressure, or a fan.

According to an aspect of the present invention, the catalyst particle generator includes a generator main body having an outlet on one side thereof, so as to allow the catalyst particles to be discharged, a heating plate which is installed in the generator main body and on which the material is placed, and a heating element which heats the material placed on the heating plate.

According to an aspect of the present invention, the catalyst supply includes a catalyst supply pipe that guides the catalyst particles discharged through the catalyst outlet to the carbon monoxide purifier.

According to an aspect of the present invention, the catalyst supply pipe communicates with a connecting pipe that connects the reformer and the inlet of the carbon monoxide purifier.

According to an aspect of the present invention, the connecting pipe includes a first fluid line which communicates with the catalyst supply pipe at one end thereof and the inlet of the carbon monoxide purifier at the other end, and a second fluid line which communicates with the first fluid line at one end thereof and the reformer at the other end. According to an aspect of the present invention, the fuel cell system further includes a fluid channel switch that switches a fluid channel so as to allow the first fluid line to selectively communicate with at least one of the catalyst supply pipe and the second fluid line.

According to an aspect of the present invention, the fuel cell system further includes a branch pipe which branches off from a connecting pipe connecting the outlet of the carbon monoxide purifier and the electricity generator, and a fluid channel switch which switches a fluid channel so as to allow the fuel gas discharged through the outlet of the carbon monoxide purifier to flow to at least one of the branch pipe and the electricity generator.

According to an aspect of the present invention, the catalyst particle generator is detachably installed to the carbon monoxide purifier.

According to an aspect of the present invention, the fuel cell system further includes a gas sensor which measures the concentration of carbon monoxide contained in the fuel gas passing through the oxidation catalyst bed.

It is another aspect of the present invention to provide a method of controlling a fuel cell system, in which the fuel cell system includes a reformer and a carbon monoxide purifier reducing a concentration of carbon monoxide contained in a fuel gas generated from the reformer. The method includes measuring the concentration of carbon monoxide included in the fuel gas discharged from the carbon monoxide purifier, and supplying catalyst particles generated from a catalyst particle generator to the carbon monoxide purifier when the measured concentration is higher than a reference value.

The supplying the catalyst particles to the carbon monoxide purifier includes controlling a fluid channel switch to close a fluid channel between the reformer and the carbon monoxide purifier and to open another fluid channel between the carbon monoxide purifier and the catalyst particle generator.

According to an aspect of the present invention, the supplying the catalyst particles to the carbon monoxide purifier further includes controlling a flow source to generate a gas flow, and applying power to the catalyst particle generator, and heating material to generate catalyst particles.

BRIEF DESCRIPTION OF THE DRAWINGS

These and/or other aspects and advantages of the invention will become apparent and more readily appreciated from the following description of the embodiments, taken in conjunction with the accompanying drawings, of which

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
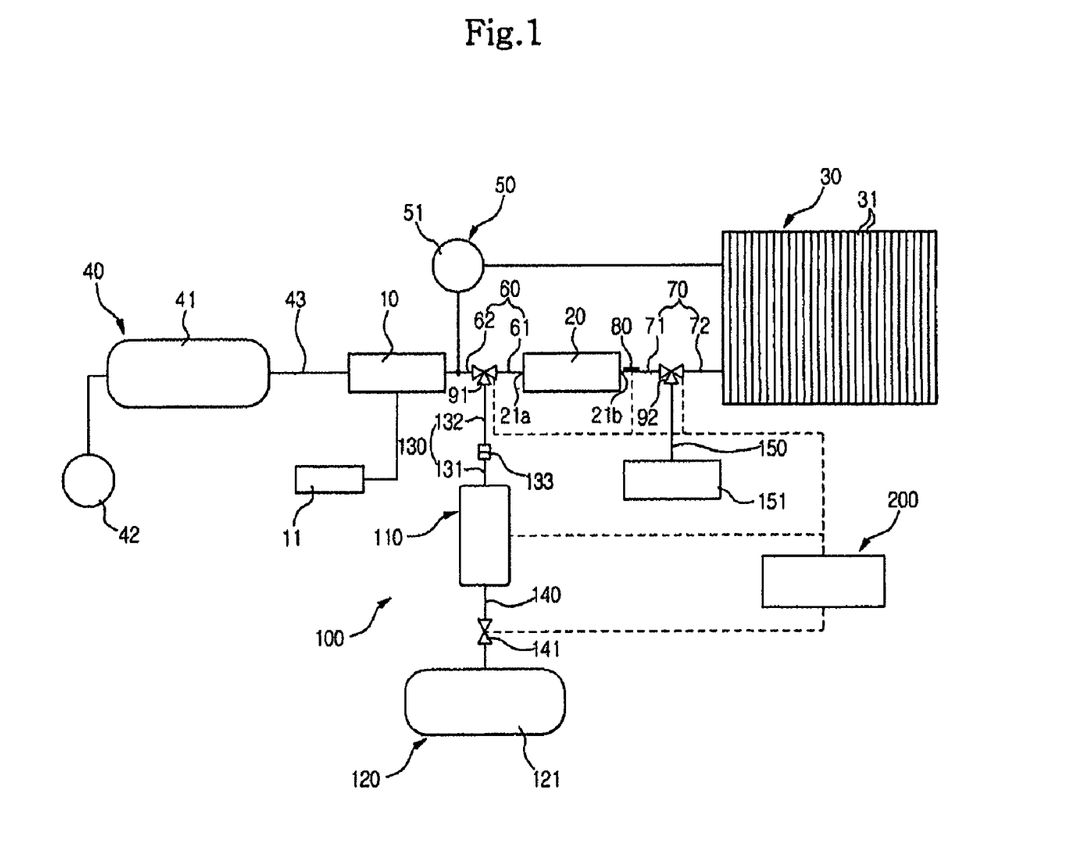
FIG. 1 is a block diagram illustrating a configuration of a fuel cell system according to a first embodiment of the present invention.

FIG. 1 is a block diagram illustrating a configuration of a fuel cell system according to a first embodiment of the present invention.

As shown in FIG. 1, a fuel cell system according to the first embodiment of the present invention, comprises a reformer 10 generating a fuel gas (hereinafter, referred to as a "hydrogen gas") from a fuel such as methanol or ethanol through a reforming catalytic reaction induced by thermal energy, a heat source 11 supplying the thermal energy required for the reforming catalytic reaction, a carbon monoxide purifier 20 reducing a concentration of carbon monoxide contained in the reformed hydrogen gas, at least one electricity generator 31 generating electrical energy through an electrochemical reaction of oxygen and the hydrogen gas supplied from the carbon monoxide purifier 20, a fuel supply 40 supplying the fuel to the reformer 10, and an air supply 50 supplying air to the carbon monoxide purifier 20 and the electricity generator 31.

The reformer 10 generates a hydrogen gas from a fuel through a reforming catalytic reaction induced by a heat source, for instance a catalytic reaction such as water vapor reformation or partial oxidation, for example. The heat source 11, which is connected to the reformer 10 and supplies heat, comprises a burner (not shown) which burns a liquid fuel such as methanol or ethanol or a gaseous fuel such as methane gas or propane gas together with air, and thereby generates thermal energy within a preset temperature range.

The carbon monoxide purifier 20 is constructed to reduce the concentration of the carbon monoxide contained in the reformed hydrogen gas through a preferential CO oxidation (PROX) reaction of the carbon monoxide and the oxygen contained in the air.

The electricity generator 31 is a minimum unit fuel cell generating electricity. A plurality of electricity generators 31 are formed into a stack 30. The electricity generator 31 comprises a membrane-electrode assembly, and separators disposed on opposite sides of the membrane-electrode assembly. The membrane-electrode assembly comprises an active region where the oxidation-reduction reaction of reactive gases takes place, and includes an anode on one side thereof, a cathode on the other side thereof, and an electrolyte membrane between these electrodes. In the anode, the oxidation reaction takes place to convert each hydrogen molecule into hydrogen ions and electrons. At this time, the hydrogen ions are delivered to the cathode via the electrolyte membrane. Meanwhile, in the cathode, the reduction reaction takes place to convert each oxygen molecule is converted into oxygen ions. Here, the oxygen ions reacts with the hydrogen ions, so that a water molecule is produced. The configuration of the electricity generator 31 is well known in the art for a polymer electrolyte type fuel cell, and so its detailed description will be omitted.

The fuel supply 40 comprises a fuel tank 41 storing the fuel, a fuel pump 42 discharging the fuel stored in the fuel tank 41, and a fuel supply pipe 43 connecting the fuel tank 41 and the reformer 10. Further, the air supply 50 comprises an air pump 51 that sucks the air at a predetermined pressure, and supplies the sucked air to the electricity generator 31 and the carbon monoxide purifier 20.

Figure 2:
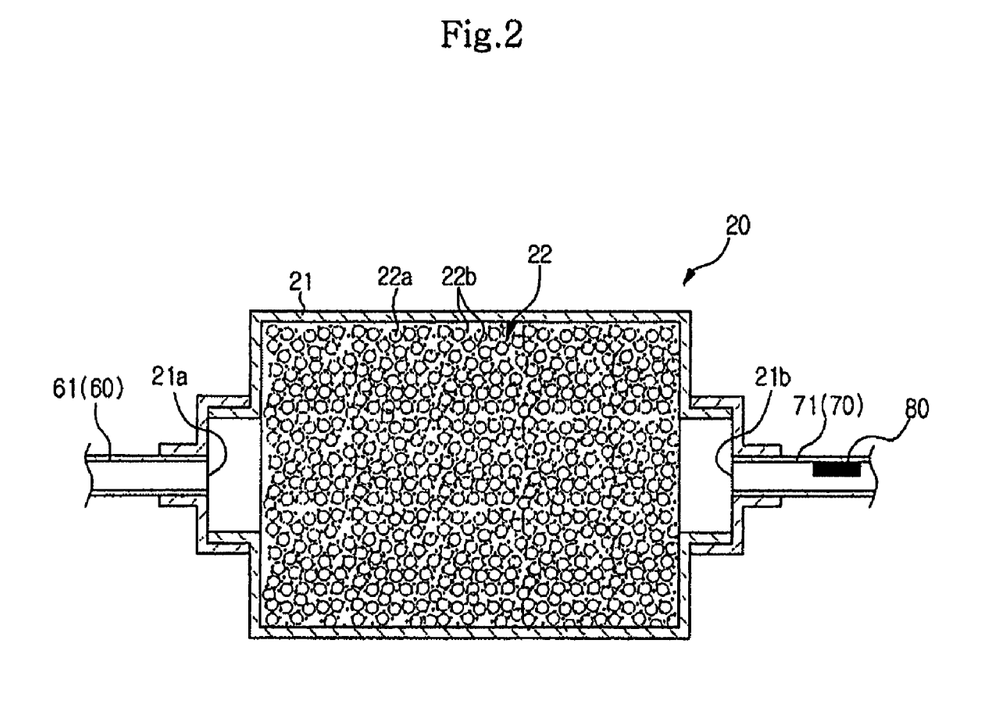
FIG. 2 is a sectional view illustrating the construction of a carbon monoxide purifier in a fuel cell system according to an embodiment of the present invention.

FIG. 2 is a sectional view illustrating a construction of a carbon monoxide purifier in a fuel cell system according to an embodiment of the present invention.

As shown in FIGS. 1 and 2, the carbon monoxide purifier 20 comprises a reactor main body 21 having a predetermined internal space, and an oxidation catalyst bed 22 provided in the internal space of the reactor main body 21 and facilitating a selective oxidation reaction of carbon monoxide and air.

The reactor main body 21 comprises an inlet 21a on one side thereof, through which the hydrogen gas generated from the reformer 10 and the air supplied from the air pump 51 are introduced into the reactor main body 21, and on the other side with an outlet 21b through which the hydrogen gas, which passes through the oxidation catalyst bed 22 and undergoes decrease of the concentration of carbon monoxide contained therein, is discharged. The inlet 21a of the reactor main body 21 is connected with the reformer 10 through a first connecting pipe 60, whereas the outlet 21b of the reactor main body 21 is connected with the electricity generator 31 through a second connecting pipe 70.

The fuel cell system according to an embodiment of the present invention, comprises a gas sensor 80 which measures the concentration of carbon monoxide contained in the hydrogen gas, which is purified while passing through the oxidation catalyst bed 22. Despite of the purifying process, when the concentration of carbon monoxide measured by the gas sensor 80 is higher than or equal to a reference value, new catalyst particles are supplied to the oxidation catalyst bed 22 through a catalyst supply 100 which will be described below. In FIG. 2, when the gas sensor 80 is installed inside the second connecting pipe 70 as illustrated, for example, however, the position of the gas sensor 80 may vary, as necessary.

As shown in FIG. 2, the oxidation catalyst bed 22 is formed by stratifying oxidation catalysts. Each oxidation catalyst includes a structure in which at least one catalytic material 22b such as platinum (Pt) or ruthenium (Ru) is carried in each pellet-like carrier 22a composed of alumina ($Al_2O_3$), silica ($SiO_2$), or titania ($TiO_2$).

Therefore, when the hydrogen gas from the reformer 10 and the air from the air pump 51 are supplied into the reactor main body 21, the oxidation reaction is promoted by such a catalytic material 22b, that the carbon monoxide contained in the hydrogen gas is converted into carbon dioxide. As a result, the concentration of carbon monoxide is reduced. However, with the lapse of an operation time, the catalytic material 22b is poisoned to undergo the deterioration of its activity, so that the reaction efficiency of the carbon monoxide purifier 20 is lowered. As such, the fuel cell system according to an embodiment of the present invention, includes the catalyst supply 100, which periodically supplies new catalyst particles to the oxidation catalyst bed 22, and thereby recovers the reaction efficiency of the carbon monoxide purifier 20.

As shown in FIG. 1, the catalyst supply 100 comprises a catalyst particle generator 110 which heats raw material used as the catalytic material to generate fine catalyst particles, a flow source 120 which causes the generated catalyst particles to flow to the oxidation catalyst bed 22 of the carbon monoxide purifier 20, a catalyst supply pipe 130 which guides the catalyst particles generated from the catalyst particle generator 110 to the carbon monoxide purifier 20, and a pipe 140 that connects the flow source 120 and the catalyst particle generator 110.

According to an embodiment of the present invention, the flow source 120 causing the catalyst particles to flow comprises a gas tank 121 in which gas (i.e., nitrogen gas) is filled under high pressure. In this case, the pipe 140 connecting the flow source 120 and the catalyst particle generator 110 comprises an on-off valve 141. When the on-off valve 141 is open, a gas flow occurs due to the pressure of the gas itself. The gas flow causes the catalyst particles generated from the catalyst particle generator 110 to move to the oxidation catalyst bed 22.

Figure 3:
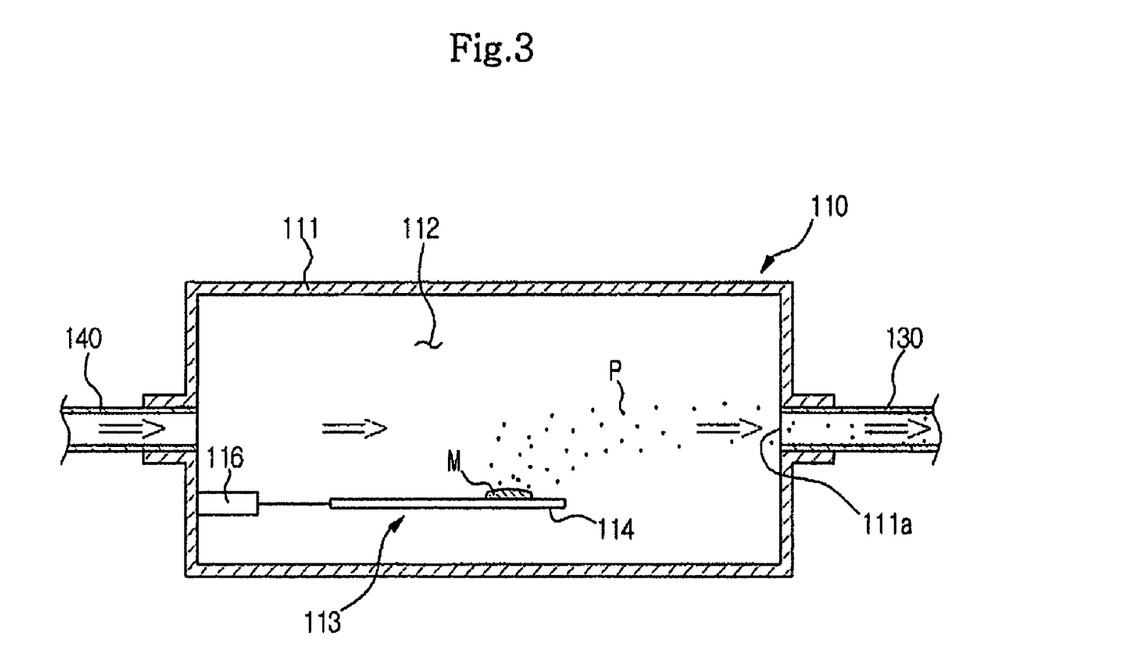
FIG. 3 is a sectional view illustrating a construction of a catalyst particle generator according to an embodiment of the present invention.
Figure 4:
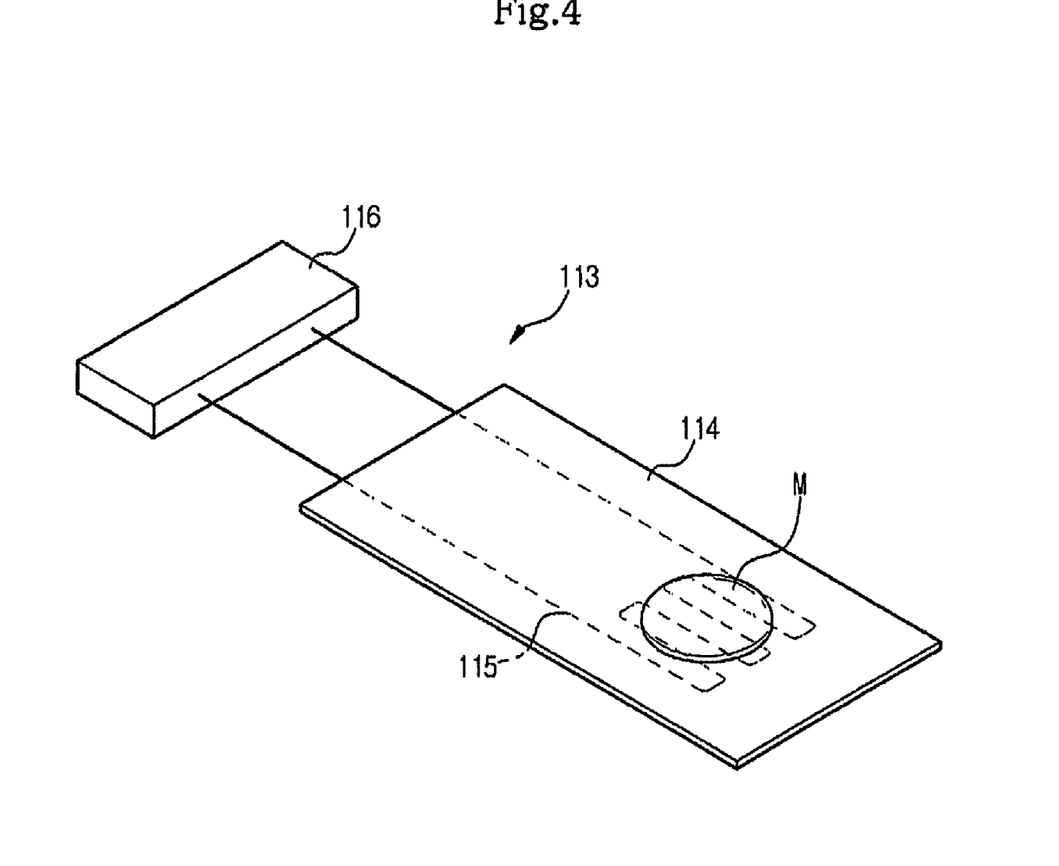
FIG. 4 is a perspective view illustrating the heater of FIG. 3.

FIG. 3 is a sectional view illustrating the construction of a catalyst particle generator according to an embodiment of the present invention, and FIG. 4 is a perspective view illustrating the heater of FIG. 3.

As shown in FIGS. 3 and 4, the catalyst particle generator 110 comprises a generator main body 111 having a fluid channel 112 so as to permit a gas flow generated by the flow source 120, and a heater 113 that heats and evaporates the catalytic material M in the generator main body 111. The catalytic material M comprises, for example, a lump of metal such as Pt or Ru.

The generator main body 111 comprises an outlet 111a on one side thereof, which discharges the generated catalyst to the catalyst supply pipe 130.

The heater 113 is installed to be able to directly heat the catalytic material M in contact with the catalytic material M, thereby allowing the catalytic material M to be heated within a short time up to temperature at which the catalytic material M is evaporated, thereby reducing power consumption. In addition, this allows an unnecessary space to be removed between the heater 113 and the catalytic material M, thereby downsizing the catalyst particle generator 110.

The heater 113 comprises a heating plate 114 on which the catalytic material M is placed, a heating element 115 that is buried in the heating plate 114 and generates heat when power is supplied, and a power supply 116 which applies power to the heating element 115. In FIG. 4, the case in which a heating wire made of a tungsten wire is used as the heating element is illustrated, for example. The heating element 115 is densely disposed near the catalytic material M in a zigzag shape, so that it can evaporate the catalytic material M within a short time.

Therefore, when the power is applied to heat the heating element 115 and then the heating plate 114, the catalytic material M placed on the heating plate 114 is evaporated. The evaporated catalytic material M meets the cold gas flow discharged from the gas tank 121 at a predetermined pressure, and thus, is instantaneously cooled to form fine catalyst particles P. These fine catalyst particles P are supplied to the oxidation catalyst bed 22 of the carbon monoxide purifier 20 through the catalyst supply pipe 130.

As shown in FIG. 1, the catalyst supply pipe 130 communicates with the first connecting pipe 60, which connects the reformer 10 and the inlet 21a of the carbon monoxide purifier 20.

The first connecting pipe 60 comprises a first fluid line 61 which communicates with the catalyst supply pipe 130 at one end thereof and the inlet 21a of the carbon monoxide purifier 20 at the other end, and a second fluid line 62 that communicates with the first fluid line 61 at one end thereof and the reformer 10 at the other end. A first fluid channel switch 91 is installed to a joint between the first connecting pipe 60 and the catalyst supply pipe 130. The first fluid channel switch 91 switches a fluid channel so as to allow the first fluid line 61 to selectively communicate with any one of the catalyst supply pipe 130 and the second fluid line 62. According to an embodiment of the present invention, the first fluid channel switch 91 includes a three-way valve. However, the first fluid channel switch 91 is not limited hereto, and may vary, as necessary.

When the first fluid channel switch 91 causes the first fluid line 61 to communicate with the second fluid line 62, the fuel gas generated from the reformer 10 is supplied to and purified at the carbon monoxide purifier 20. In contrast, when the first fluid channel switch 91 causes the first fluid line 61 to communicate with the catalyst supply pipe 130, the catalyst particles generated from the catalyst particle generator 110 is supplied to the carbon monoxide purifier 20 through the catalyst supply pipe 130, the first fluid line 61, and the inlet 21a.

Meanwhile, the catalyst particle generator 110 can be disconnected from the carbon monoxide purifier 20. To this end, the catalyst supply pipe 130 is provided with a connection fitting 133, which connects a first line 131 of the catalyst supply pipe 130, which is connected to the catalyst particle generator 110, to a second line 132 connected to the first connecting pipe 60, or which disconnects the first line 131 from the second line 132.

In this manner, when being detachably installed, the catalyst particle generator 110 constructed as a separate unit can be connected to the carbon monoxide purifier 20 only when the catalyst is necessary to add. Hence, the fuel cell system of the present invention, is prevented from growing in volume due to the catalyst particle generator.

Further, the fuel cell system according to an embodiment of the present invention, comprises a branch pipe 150 branching off from the second connecting pipe 70. The branch pipe 150 discharges the gas from the carbon monoxide purifier 20 after the catalyst particles are supplied to the oxidation catalyst bed 22 (where the discharged gas is the nitrogen gas discharged from the carbon monoxide purifier when the flow source makes use of a nitrogen gas tank as in this embodiment). The branch pipe 150 is connected with a filter 151, which filters the catalyst particles or other harmful gases remaining in the discharged gas.

The second connecting pipe 70, like the first connecting pipe 60, comprises a first fluid line 71 which communicates with the branch pipe 150 at one end thereof and the outlet 21b of the carbon monoxide purifier 20 at the other end, and a second fluid line 72 that communicates with the first fluid line 71 at one end thereof and the electricity generator 31 at the other end. A second fluid channel switch 92 is installed to a joint between the second connecting pipe 70 and the branch pipe 150. The second fluid channel switch 92 switches a fluid channel so as to allow the first fluid line 71 to selectively communicate with any one of the branch pipe 150 and the second fluid line 72. According to an embodiment of the present invention, the second fluid channel switch 92 comprises include a three-way valve. However, the second fluid channel switch is not limited hereto, and may vary, as necessary.

When the second fluid channel switch 92 causes the first fluid line 71 to communicate with the second fluid line 72, the fuel gas purified by the carbon monoxide purifier 20 is supplied to the electricity generator 31, and thus generates electricity. In contrast, when the second fluid channel switch 92 causes the first fluid line 71 to communicate with the branch pipe 150, the gas discharged from the carbon monoxide purifier 20 after the catalyst particles are supplied to the oxidation catalyst bed 22 is discharged outside through the first fluid line 71 and the branch pipe 150.

Meanwhile, the catalyst particle generator 110, the on-off valve 141, the first fluid channel switch 91, and the second fluid channel switch 92 are connected to a controller 200, and thus their operations are controlled by the controller 200.

Figure 5:
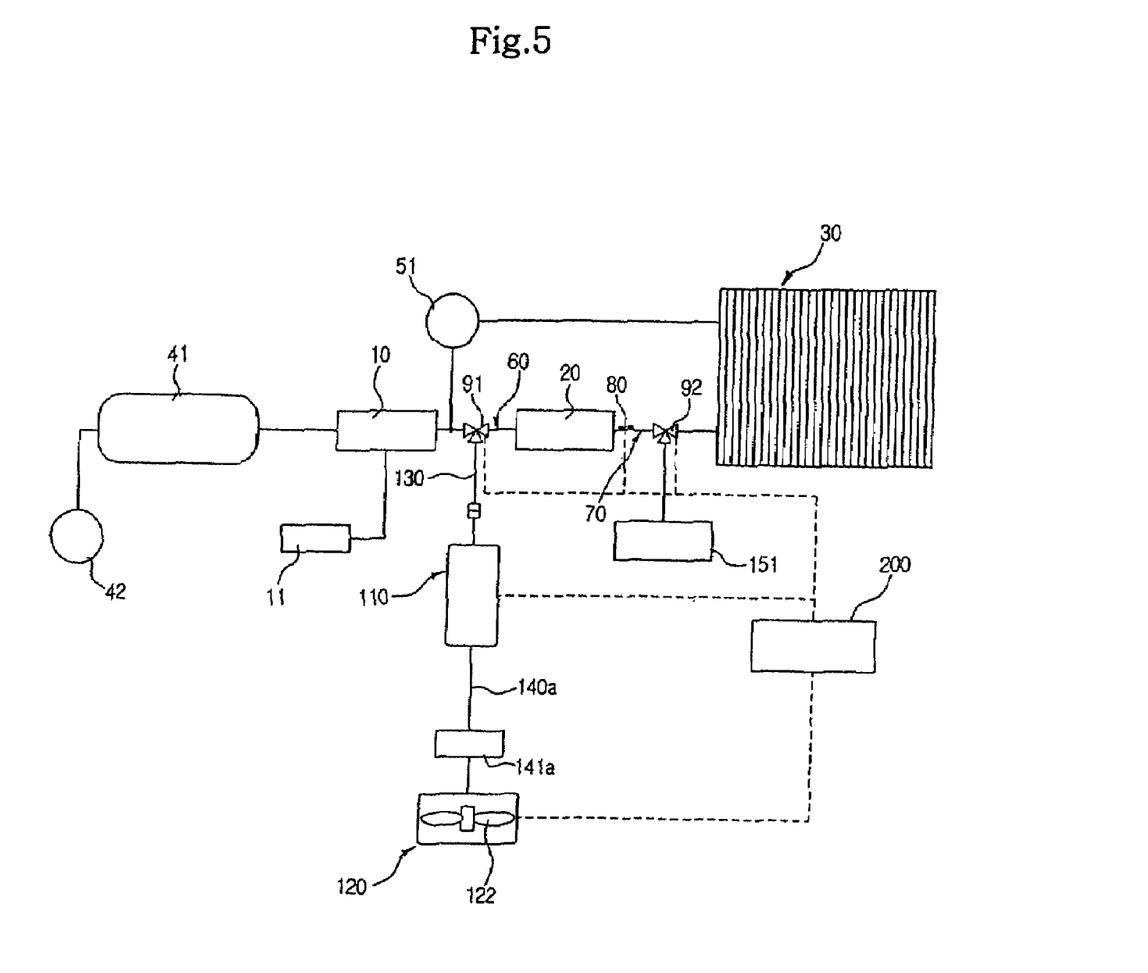
FIG. 5 is a block diagram illustrating a configuration of a fuel cell system according to a second embodiment of the present invention.

FIG. 5 is a block diagram illustrating the configuration of a fuel cell system according to a second embodiment of the present invention. Hereinafter, only the characteristics of the second embodiment will be described, and like numbers refer to like components.

As shown in FIG. 5, in fuel system according to the second embodiment of the present invention, a fan 122 is used as the flow source 120. In the first embodiment of FIG. 1, the gas stored in the gas tank 121 is used as a medium transporting the catalyst particles to the carbon monoxide purifier 20. However, in the second embodiment of the present invention, the air flowing by means of the fan 122 moves the catalyst particles generated from the catalyst particle generator 110 to the carbon monoxide purifier 20. A pipe 140a connecting the fan 122 and the catalyst particle generator 110 is connected to a filter 141a, which filters the air introduced from the outside.

Figure 6:
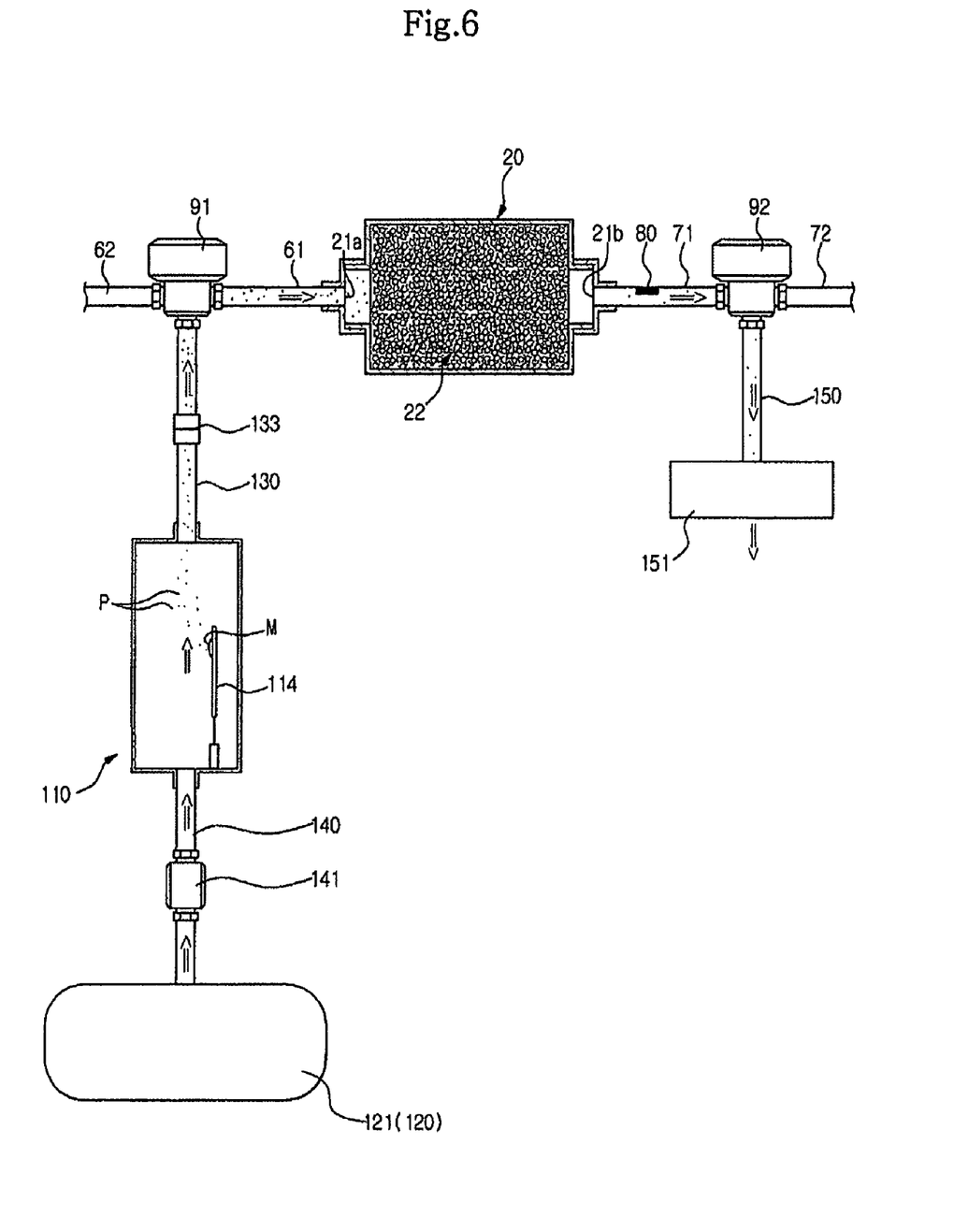
FIG. 6 is a view illustrating an operation of supplying a catalyst in a fuel cell system according to an embodiment of the present invention.
Figure 7:
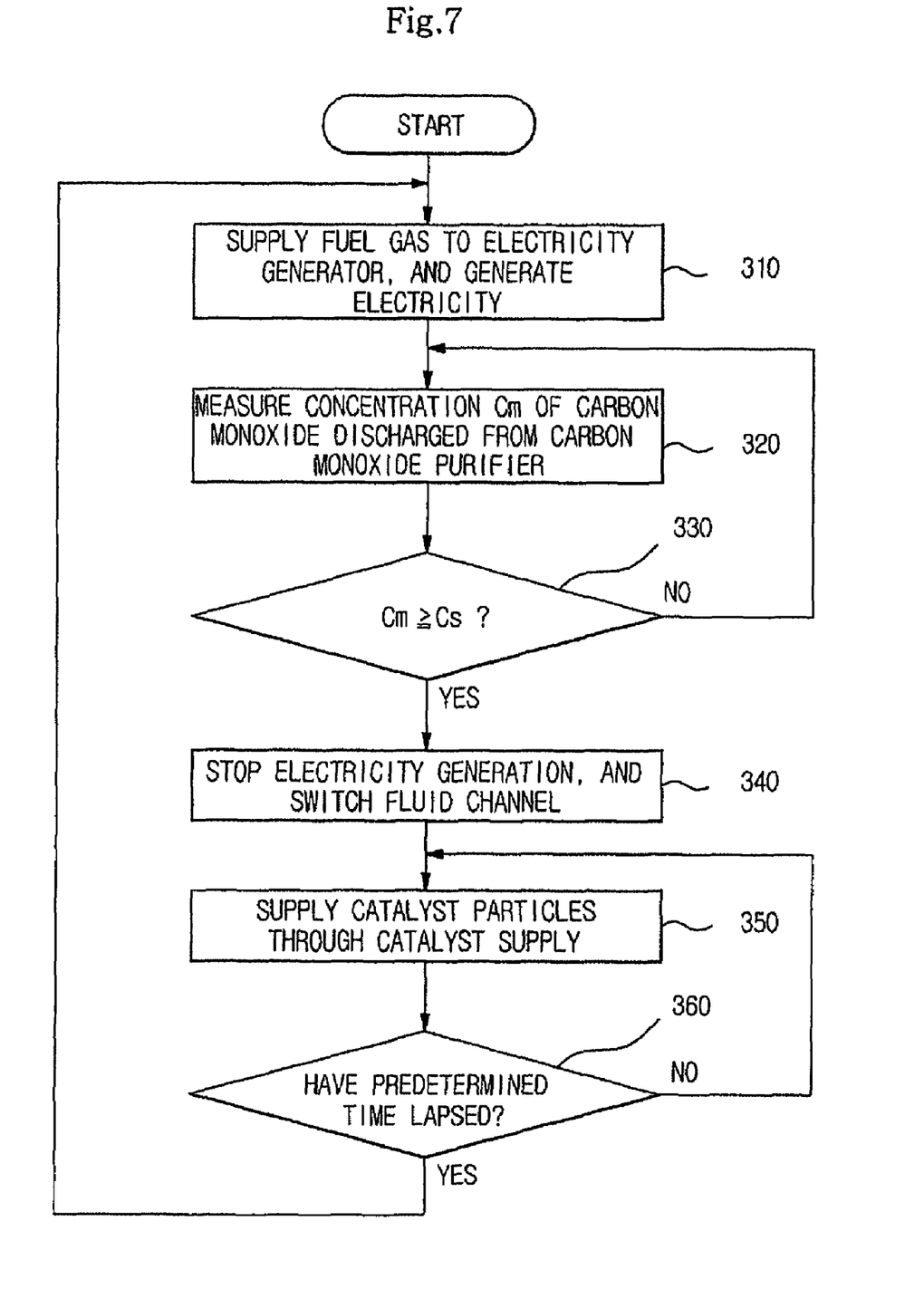
FIG. 7 is a flowchart illustrating a control method of a fuel cell system according to an embodiment of the present invention.

Now, the operation and control method of a fuel cell system according to an embodiment of the present invention will be described with reference to FIGS. 1, 6 and 7. FIG. 6 is a view illustrating an operation of supplying a catalyst in a fuel cell system according to an embodiment of the present invention, and FIG. 7 is a flowchart illustrating the control method of a fuel cell system according to an embodiment of the present invention.

The fuel stored in the fuel tank 41 is supplied to the reformer 10 by driving the fuel pump 42. Then, the reformer 10 is supplied with heat from the heat source 11, and generates hydrogen gas from the fuel by means of a reforming reaction. At this time, the reforming reaction is difficult to completely perform, thereby generating the hydrogen gas in which a by-product, carbon monoxide, is contained. In this manner, the hydrogen gas generated from the reformer 10 is supplied to the carbon monoxide purifier 20 through first connecting pipe 60. At this time, the controller 200 controls the first fluid channel switch 91 to close the catalyst supply pipe 130 and to cause the first and second fluid lines 61 and 62 of the first connecting pipe 60 to communicate with each other, so that the hydrogen gas generated from the reformer 10 can be supplied to the carbon monoxide purifier 20. The carbon monoxide contained in the hydrogen gas supplied to the carbon monoxide purifier 20 passes through the oxidation catalyst bed 22 in the reactor main body 21, and gives rise to a selective oxidation reaction with oxygen in the air supplied by the air pump 51. Therefore, the concentration of carbon monoxide is reduced. The hydrogen gas going through this purifying process is supplied to the electricity generator 31 through the second connecting pipe 70. At this time, the controller 200 controls the second fluid channel switch 92 to close the branch pipe 150 and to cause the first and second fluid lines 71 and 72 of the second connecting pipe 70 to communicate with each other, so that the hydrogen gas discharged from the carbon monoxide purifier 20 can be supplied to the electricity generator 31. The hydrogen gas supplied to the electricity generator 31 participates in oxidation-reduction reaction together with the air (oxygen) supplied by the air pump 51, thereby generating electricity (see operation 310).

Meanwhile, the hydrogen gas going through this purifying process passes through the gas sensor 80 installed to the second connecting pipe 70 when supplied to the electricity generator 31. At this time, the gas sensor 80 measures the concentration of carbon monoxide ($C_m$) unremoved by the carbon monoxide purifier 20, and provides the measured result to the controller 200 (see operation 320).

Then, the controller 200 compares the measured concentration $C_m$ of carbon monoxide with a reference value $C_s$ (see operation 330). As a result of the comparison, when it is determined that the measured concentration of carbon monoxide is higher than or equal to the reference value, the controller 200 stops the generation of electricity as described in operation 310, and controls the first and second fluid channel switches 91 and 92 to switch a fluid channel. More specifically, the controller 200 controls the first fluid channel switch 91 not only to cause the first fluid line 61 of the first connecting pipe 60 to communicate with the catalyst supply pipe 130 but also causes the second fluid line 62 of the first connecting pipe 60 to be closed. Further, the controller 200 controls the second fluid channel switch 92 not only to cause the first fluid line 71 of the second connecting pipe 70 to communicate with the branch pipe 150 but also cause the second fluid line 72 of the second connecting pipe 70 to be closed (see operation 340). When it is determined that the measured concentration of Cm is less than the reference value, the process returns to operation 320 and repeats the measuring process.

In this state, the controller 200 opens the on-off valve 141, which is installed to the pipe 140 connecting the gas tank 121 and the catalyst particle generator 110, to cause a predetermined pressure of gas to be discharged from the gas tank 121. Then, the discharged gas flows to the catalyst particle generator 110. (This is different from the second embodiment of FIG. 5 in that the controller 200 operates the fan 122 to cause the air to flow to the catalyst particle generator.) Further, the controller 200 applies power to the catalyst particle generator 110, thereby heating the heating plate 114 to evaporate catalytic material M placed on the heating plate 114. The evaporated catalytic material M meets the gas flow to be instantaneously cooled. In this process, fine catalyst particles P are generated. The generated catalyst particles P pass through the oxidation catalyst bed 22 of the carbon monoxide purifier 20 via the first fluid line 61 of the first connecting pipe 60 together with the gas flow passing through the catalyst supply pipe 130. At this time, the catalyst particles P are attached to the carriers 22a of the oxidation catalyst bed 22. In this manner, when new catalyst particles are supplied to the oxidation catalyst bed 22, the function of the oxidation catalyst bed 22 is recovered to improve the reaction efficiency of the carbon monoxide purifier 20. The gas flow passing through the oxidation catalyst bed 22 is discharged from the reactor main body 21 through the outlet 21b, and then is discharged outside through the first fluid line 71 of the second connecting pipe 70 and the branch pipe 150 (see operation 350).

After the process of supplying the catalysts has lasted for a fixed time, the process returns to operation 310, where electricity is generated through the same process (see operation 360).

As described above, according to an embodiment of the present invention, the new catalyst particles are adapted to be supplied to the oxidation catalyst bed of the carbon monoxide purifier, so that the carbon monoxide purifier and the fuel cell system can be improved in performance on the whole.

Further, although the oxidation catalyst bed is not formed to be thicker than needed in consideration of its durability, the durability of the oxidation catalyst bed can be sufficiently secured. Accordingly, the carbon monoxide purifier and the fuel cell system according to an embodiment of the present invention, can be downsized on the whole. In addition, the fuel cell system can save the initial cost of production, the cost of operation, and the cost of maintenance.

Although few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A fuel cell system comprising:
a reformer to generate a fuel gas through a reforming reaction;
a carbon monoxide purifier comprising a reactor main body having an inlet into which a reformed fuel gas is introduced and an outlet through which a purified fuel gas is discharged, and an oxidation catalyst bed that is filled in the reactor main body, and to reduce a concentration of carbon monoxide included in the fuel gas generated from the reformer;
at least one electricity generator supplied with the fuel gas from the carbon monoxide purifier to generate electricity by means of a chemical reaction;
a gas sensor that measures the concentration of carbon monoxide contained in the fuel gas passed through the oxidation catalyst bed; and
a catalyst supply to generate catalyst particles from material, and to supply the catalyst particles to the oxidation catalyst bed when the gas sensor indicates that the concentration of carbon monoxide is greater than or equal to a reference value.

2. The fuel cell system as claimed in claim 1, wherein the catalyst supply comprises a catalyst particle generator which heats the material to generate the catalyst particles.

3. The fuel cell system as claimed in claim 2, wherein the catalyst supply further comprises a flow source which causes the catalyst particles generated from the catalyst particle generator to flow to the oxidation catalyst bed.

4. The fuel cell system as claimed in claim 3, wherein the flow source comprises a gas tank in which gas is filled at high pressure.

5. The fuel cell system as claimed in claim 3, wherein the flow source comprises a fan.

6. A fuel cell system comprising:
a reformer to generate a fuel gas through a reforming reaction;
a carbon monoxide purifier comprising a reactor main body having an inlet into which a reformed fuel gas is introduced and an outlet through which a purified fuel gas is discharged, and an oxidation catalyst bed that is filled in the reactor main body, and to reduce a concentration of carbon monoxide included in the fuel gas generated from the reformer;
at least one electricity generator supplied with the fuel gas from the carbon monoxide purifier to generate electricity by means of a chemical reaction; and
a catalyst supply to generate catalyst particles from material and to supply the catalyst particles to the oxidation catalyst bed, the catalyst supply including a catalyst particle generator which heats the material to generate the catalyst particles,
wherein:
the catalyst particle generator comprises a generator main body having an outlet on one side thereof, so as to allow the catalyst particles to be discharged, a heating plate which is installed in the generator main body and on which the material is placed, and a heating element which heats the material placed on the heating plate; and
the catalyst supply further comprises a catalyst supply pipe which guides the catalyst particles discharged through the catalyst outlet to the carbon monoxide purifier.

7. The fuel cell system as claimed in claim 6, wherein the catalyst supply pipe communicates with a connecting pipe which connects the reformer and the inlet of the carbon monoxide purifier.

8. The fuel cell system as claimed in claim 7, wherein the connecting pipe comprises:
a first fluid line that communicates with the catalyst supply pipe at one end thereof and the inlet of the carbon monoxide purifier at the other end, and a second fluid line that communicates with the first fluid line at one end thereof and the reformer at the other end; and
a fluid channel switch which switches a fluid channel so as to allow the first fluid line to selectively communicate with at least one of the catalyst supply pipe and the second fluid line.

9. The fuel cell system as claimed in claim 1, further comprising:
a branch pipe which branches off from a connecting pipe connecting the outlet of the carbon monoxide purifier and the electricity generator; and
a fluid channel switch which switches a fluid channel so as to allow the fuel gas discharged through the outlet of the carbon monoxide purifier to flow to at least one of the branch pipe and the electricity generator.

10. The fuel cell system as claimed in claim 1, wherein the catalyst particle generator is detachably installed to the carbon monoxide purifier.

* * * * *

UNITED STATES PATENT AND TRADEMARK OFFICE
CERTIFICATE OF CORRECTION

PATENT NO. : 7,923,158 B2  
APPLICATION NO. : 11/889661  
DATED : April 12, 2011  
INVENTOR(S) : Jun Ho Ji It is certified that error appears in the above-identified patent and that said Letters Patent is hereby corrected as shown below:

Title Page Column 1 (Inventor) item (75), Line 1, Delete "Namyangiu-si" and insert -- Namyangju-si --, therefor.

Signed and Sealed this
Twenty-first Day of February, 2012

David J. Kappos
*Director of the United States Patent and Trademark Office*